United States Patent [19]

Lee

[11] Patent Number: 5,933,586
[45] Date of Patent: Aug. 3, 1999

[54] DATA CONVERSION CIRCUIT AND METHOD IN A COMPUTING AND PRINTING SYSTEM

[75] Inventor: Bong-Gi Lee, Kwacheon, Rep. of Korea

[73] Assignee: SamSung Electronics Co., Ltd., Kyungki-do, Rep. of Korea

[21] Appl. No.: 08/829,450

[22] Filed: Mar. 28, 1997

[30] Foreign Application Priority Data

Mar. 29, 1996 [KR] Rep. of Korea ..................... 1996-9211

[51] Int. Cl.⁶ ....................................... B41B 15/00
[52] U.S. Cl. ......................... 395/115; 395/114; 395/116; 395/117; 400/76; 347/247
[58] Field of Search ........................... 395/101, 110–117, 395/109; 400/76; 347/254–256, 247; 358/296; 346/33 R

[56] References Cited

U.S. PATENT DOCUMENTS

| | | | |
|---|---|---|---|
| 4,729,038 | 3/1988 | Miura et al. ............................. | 347/247 |
| 4,809,216 | 2/1989 | Lai .......................................... | 395/116 |
| 4,882,686 | 11/1989 | Gretter .................................. | 346/33 R |
| 5,008,685 | 4/1991 | Arai ........................................ | 347/255 |
| 5,068,676 | 11/1991 | Yoshida et al. ......................... | 347/247 |
| 5,079,639 | 1/1992 | Mochinaga .............................. | 358/473 |
| 5,210,823 | 5/1993 | Moroi ..................................... | 395/116 |
| 5,445,459 | 8/1995 | Sasaki ..................................... | 400/76 |
| 5,473,359 | 12/1995 | Yamada .................................. | 347/247 |
| 5,533,175 | 7/1996 | Lung et al. .............................. | 395/115 |
| 5,548,321 | 8/1996 | Murakami et al. ..................... | 347/256 |
| 5,586,229 | 12/1996 | Kim et al. ............................... | 395/116 |
| 5,587,800 | 12/1996 | Miyazaki ................................ | 358/296 |

*Primary Examiner*—Leo H. Boudreau
*Assistant Examiner*—Ishrat Sherali
*Attorney, Agent, or Firm*—Robert E. Bushnell, Esq.

[57] ABSTRACT

A printer driver (which can be software) converts printing data into a data code and compares a quantity of the data code with a storage capacity of a memory prepared in a printer. If the quantity of the data code exceeds the storage capacity of the memory, then the data code is converted into bit map data that can be processed at a print engine of the printer. As the result of the comparison, if the quantity of the data code does not exceed the storage capacity of the memory, then the data code is transmitted to the printer. If the quantity of the data code exceed the storage capacity of the memory, then the bit map data is transmitted to the printer.

19 Claims, 5 Drawing Sheets

DATA CONVERSION CIRCUIT AND METHOD IN A COMPUTING AND PRINTING SYSTEM

CLAIM OF PRIORITY

This application makes reference to, incorporates the same herein, and claims all benefits accruing under 35 U.S.C. §119 from an application for DATA CONVERSION IN PRINTER DRIVER earlier filed in the Korean Industrial Property Office on 29 Mar. 1996 and there duly assigned Ser. No. 9211/1996.

BACKGROUND OF THE INVENTION

1. Field of the Invention

The present invention relates to a printer driver, especially a printer driver that is implemented as software rather than as hardware. More particularly, the present invention relates to a circuit and a method for converting printing data in a printer driver.

2. Description of the Related Art

A printer driver may be used when a computer user desires to print out a letter or an image information by way of a printer while working on a computer application program. Often, such a printer driver is a software program which is designed such that the application program may control a printer, even when the printer has atypical hardware and internal control commands. This is useful because each printer may employ a different operating method, a different code, and a different command system for each special printer functions. With use of the printer driver, however, the application program may properly control any types of printers in spite of these differences.

In recent times, GUI (Graphic User Interface) provides a unique printer driver. In such a printer driver, GUI gives a graphic icon for the printer control command. Therefore, it is not necessary that an application program utilizing the GUI should include a separate printer driver. The challenge is to provide an ever more effective use of the printer driver, especially as to the effective handling of memory. An exemplar of the contemporary art on this matter is Miyazaki (U.S. Pat. No. 5,587,800, Image Processing Method And Apparatus, Dec. 24, 1996) discussing a page printer storing form data received from a host computer into a RAM before printing output. In the case where the respective cache memories are full, the pattern of the lowest access frequency among registered patterns is deleted, thus realizing effective use of cache memories. Gretter (U.S. Pat. No. 4,882,686, Printing Apparatus With Improved Data Formatting Circuitry, Nov. 21, 1989) discusses an integrated circuit memory chip having sufficient buffer memory sites for storing either a full line of image signals to be printed or image signals sufficient for filling more than one shift register assemblage associated with the recording element driver. Image signals are read from the memory chip to the intermediate register in a non-consecutive sequential order. Arai (U.S. Pat. No. 5,008,685, Laser Generator For Producing Modulating Data Therefor, Apr. 16, 1991) discusses a laser generating apparatus inputting a laser scanner as modulating data signal indicative of the logical sum of serial data corresponding to image formation and an arbitrarily delayed version of the serial data. Yoshida et al (U.S. Pat. No. 5,068,676, Image Data Storing Device For An Image Forming Apparatus, Nov. 26, 1991) discusses an image data storing device for an image forming apparatus having a multitude of line buffers to which image data are written from external equipment and from which the written image data are read to form an image. During an image forming period, the selectors condition each of the line buffers for one of three different states while, during a non-image forming period, they hold the line buffers in individual states. This allows the line buffers to start operating under the same conditions whenever an image forming period is reached. Yamada (U.S. Pat. No. 5,473,359, Image Forming Apparatus, Dec. 5, 1995) discusses a laser beam printer apparatus which can add printing data after bit map image data is expanded to printing data. Such additional printing data is synthesized with printing data at a predetermined period on basis of a clock supplied from either a main controlling unit or an image forming section. Murakami et al. (U.S. Pat. No. 5,548,321, Optical Scanning Apparatus For Scanning Laser Beam On Imaging Surface And Recording Image Data On Imaging Surface In Units Of Dots, Aug. 20, 1996) discusses an optical scanning apparatus. In accordance with the operation of an address counter, a bus switching circuit selectively reads out dot width data of a pattern different from a preceding pattern from the memory for each scanning operation, and outputs the data to a latch circuit. Miura et al. (U.S. Pat. No. 4,729,038, Recording Apparatus Capable Of Forming A Shadow Print Impression To Characters, Mar. 1, 1988) discusses a laser recording apparatus. Line memories are utilized to store data therein, and examined to determine any change of stored data from non-character data to character data whereupon a shadow printing operation is also preferred. From my study of these contemporary practices and the art, I have found that there is a need to convert printing data into bit map data that can be processed at a printer when the quantity of the printing data exceeds the storage capacity of a memory for storing the printing data.

SUMMARY OF THE INVENTION

Therefore, an object of the present invention is to provide an improved data conversion circuit and process in a printer device.

It is another object to provide a circuit and process for converting printing data into bit map data that can be processed at a printer, when the quantity of the printing data exceeds a storage capacity of a memory for storing the printing data.

To achieve these and other objects, the present invention contemplates converting printing data in a printer driver by converting printing data into a data code and comparing a quantity of the data code with the storage capacity of a memory prepared in a printer. If the quantity of the data code exceeds the storage capacity of the memory, then the data code is converted into bit map data that can be processed at a print engine of the printer. If the quantity of the data code does not exceed the storage capacity of the memory, then the data code is transmitted to the printer. If the quantity of the data code exceeds the storage capacity of the memory, then the bit map data is transmitted to the printer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT(S)

Figure 1:
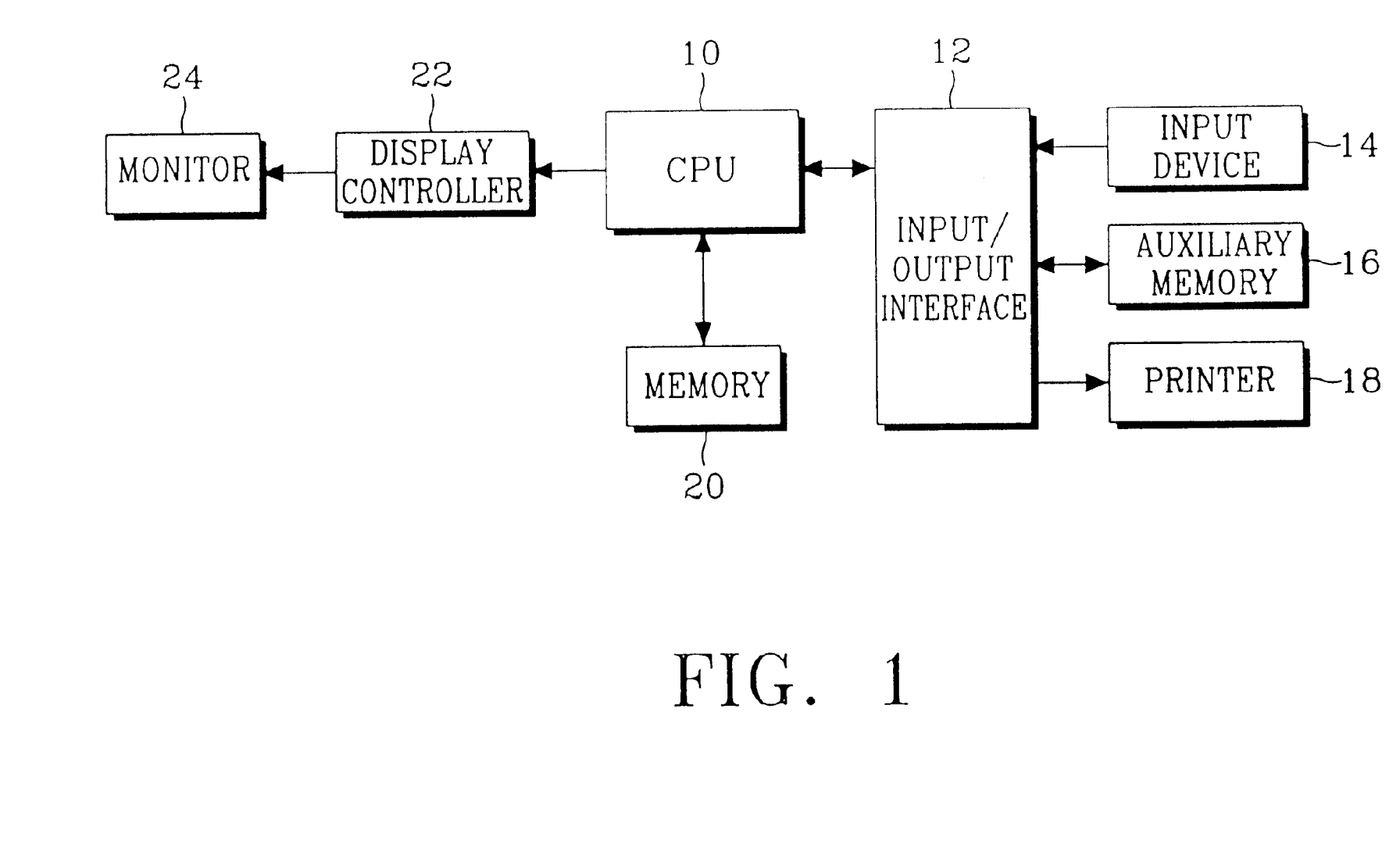
FIG. 1 is a schematic block diagram showing an abstract representation of a hypothetical contemporary computer system.

Turning now to the drawings, a contemporary computer system of FIG. 1 includes a CPU (Central Processing Unit) 10, an input/output interface 12, an input device 14, a printer 18, an auxiliary memory 16, a memory 20, a display controller 22, and a monitor 24.

The CPU 10 executes predetermined software programs to control the overall computer system. The input/output interface 12 interfaces the input/output signals among the CPU 10, the input device 14, the auxiliary memory 16, and the printer 18. The input device 14, which may be a keyboard or a mouse, provides the CPU 10 with data and commands via the input/output interface 12. The auxiliary memory 16 can be a hard disk drive and a floppy disk drive. The printer 18 prints out various information from the CPU 10. If necessary, the user may replace the printer 18 with another printing device such as a plotter.

The CPU 10 also controls the display controller 22 to display, on the monitor 24, various information from the CPU 10. The memory 20 comprised of RAM (Random Access Memory) and ROM (Read Only Memory) stores a predetermined software program for the CPU 10 and temporarily stores the data processed at the CPU 10.

Figure 2:
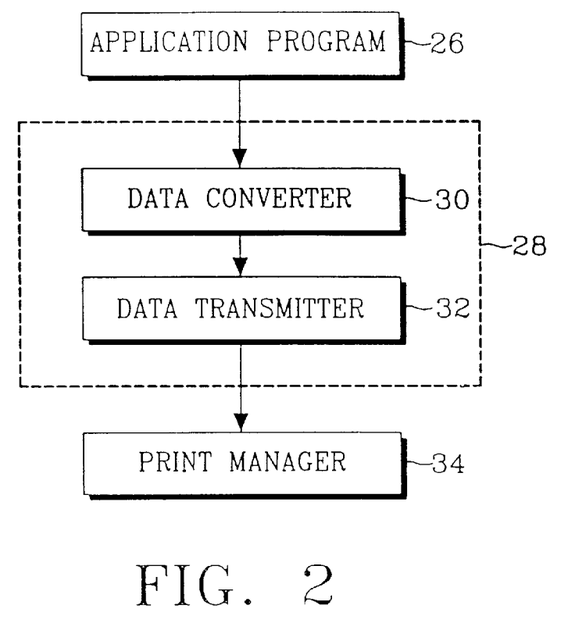
FIG. 2 is an illustration showing a printing program as may be performed according to a contemporary practice.

FIG. 2 is an illustration for explaining a printing program according to a contemporary practice, in which a contemporary practice printing program includes a GUI application program 26, a printer driver 28, and a print manager 34. The printer driver 28 includes a data converter 30 and a data transmitter 32. If the GUI application program 26 executes a printing command for printing out an image that the user has worked on, the data converter 30 reads out printing data from the memory 20 and converts the printing data into a data code that can be processed by a video controller provided in the printer 18. Here, the memory 20 stores the printing data for the image that the user has worked on. The data transmitter 32 transmits the data code received from the data converter 30 to the print manager 34. If the program is established such that the print manager 34 operates on the GUI environment, the data code is sequentially transmitted to the printer 18.

Figure 3:
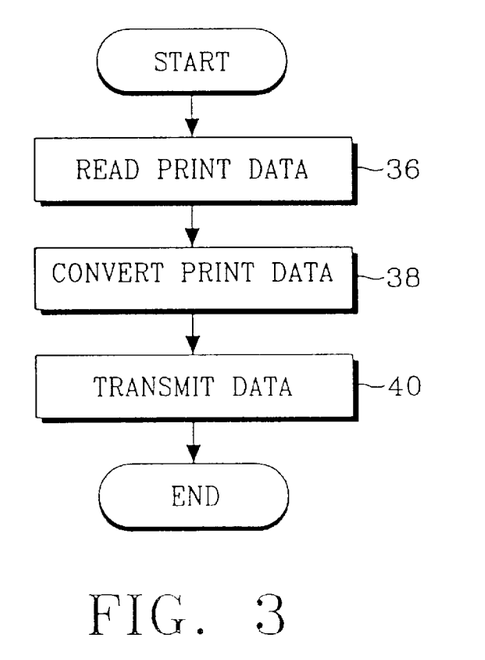
FIG. 3 is a flow chart for explaining an operation of a printer driver shown in FIG. 2.

FIG. 3 is a flow chart of the printer driver 28 shown in FIG. 2. If the GUI application program 26 applies the printing command to the input device 14 to print out the image, then printing start data is transmitted to the CPU 10 through the input/output interface 12. Afterwards, the CPU 10 controls a process flow of the printer driver 28 in accordance with the printing start data. Beginning the process flow of the printer driver 28, the CPU 10 reads out, at a step 36, the printing data from the memory 20. Then, at a step 38, the CPU 10 converts the printing data into the data code that can be processed at the video controller provided in the printer 18. For example, PCL (Printer Control Language) may be used for converting the printing data into the data code. After completion of this data conversion, the CPU 10 transmits, at a step 40, the data code to the print manager 34. When the data code transmission is completed, the process flow of the printer driver 28 is ended. Then, the print manager 34 sequentially transmits the data code to the printer 18.

Figure 6:
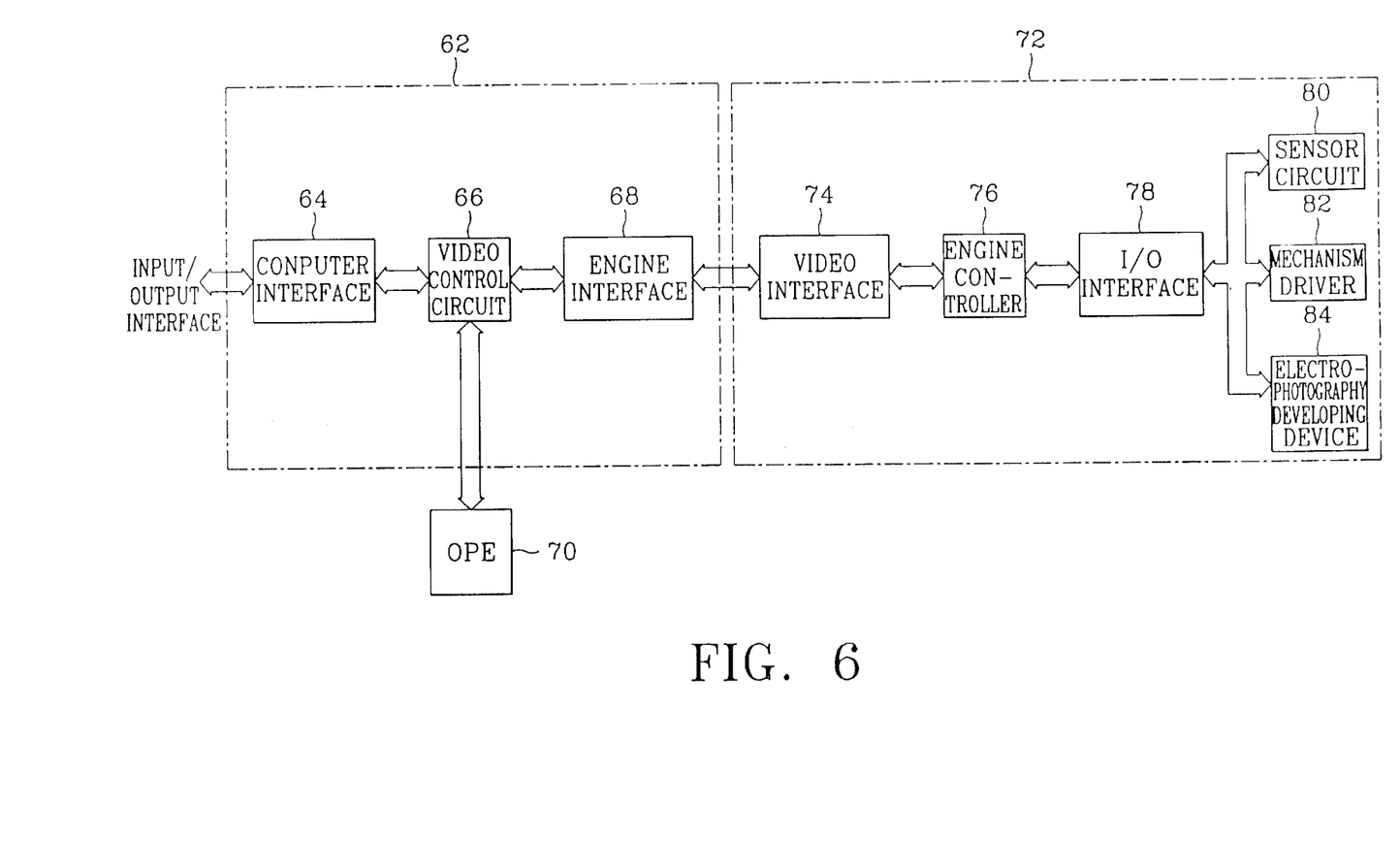
FIG. 6 is a schematic block diagram showing a structure of a contemporary printer.

FIG. 6 is a block diagram showing a contemporary laser beam printer. Although the laser beam printer is taken only by way of an example for clearly explaining the problems of a contemporary practice, this application is not limited to the laser beam printer.

The laser beam printer may include a video controller 62, a print engine 72, and an OPE (Operating Panel Equipment) 70. The video controller 62 includes a computer interface 64, a video control circuit 66, and an engine interface 68. The computer interface 64 is connected between the input/output interface 12 and the video control circuit 66 to give interface to the input/output signal therebetween. The video control circuit 66 includes a RAM for temporarily storing various data codes received from the ROM storing a control program, the OPE 70, and the input/output interface 12. The video control circuit 66 converts the data codes received from the computer interface 64 into bit map data, which is to be transmitted to the print engine 72. The engine interface 68 interfaces the input/output signals with the print engine 72 under the control of the video control circuit 66. The OPE 70 which is controlled by the video control circuit 66 includes a plurality of keys for inputting various commands, and a display for displaying operational information of the laser beam printer. The print engine 72 connected to the video controller 62 includes a video interface 74, an engine controller 76, an I/O interface 78, a sensor circuit 80, a mechanism driver 82, and an electro-photography electron developing device 84. The video interface 74 interfaces the transmission/reception signals between the video controller 62 and the engine controller 76. The engine controller 76 controls the mechanism driver 82 and the electro-photography electron developing device 84 under the control of the video controller 62, to print out on a paper the image of the bit map data received from the video controller 62. The engine controller 76 senses operational status of the respective parts of the print engine 72 by means of the sensor circuit 80. For example, the operational status mentioned above refers to the operational status of feeding and transferring the paper. The I/O interface 78 is connected to the engine controller 76, the sensor circuit 80, the mechanism driver 82 and the electro-photography electron developing device 84, so as to interface the input/output signals from the engine controller 76. The sensor circuit 80 includes a plurality of sensors for sensing, for example, operational status of the respective parts of the print engine 72, the paper feeding and transferring status, a residual quantity of the developer and other process parameters, to provide the engine controller 76 with the sensing signals from the respective sensors. The mechanism driver 82 drives mechanism parts for feeding and transferring the paper and printing the image in accordance with the control of the engine controller 76. The electro-photography electron developing device 84 prints the image of the bit map data on the paper in accordance with the control of the engine controller 76.

In such a contemporary practice device, wherein the printer driver 28 converts the printing data transmitted from the application program 26 into the data code, if the data to be printed is not properly restructured, the data will overflow. Such data overflow is caused because the printing data read out from the memory 20 is converted into the data code sequentially, without restructuring the data and control code transmitted confusedly from the application program 26. Therefore, if the data code exceeds a predetermined quantity (i.e., storage capacity of the memory), the printer 18 should include an extra memory such as RAM for storing the excessive data code. Further, the time for transmitting the data from the computer to the printer 18 will increase so much as the excessive quantity of the data code. Accordingly, a contemporary practice device has the problems of increasing the manufacturing cost and the data transmission time.

Figure 4:
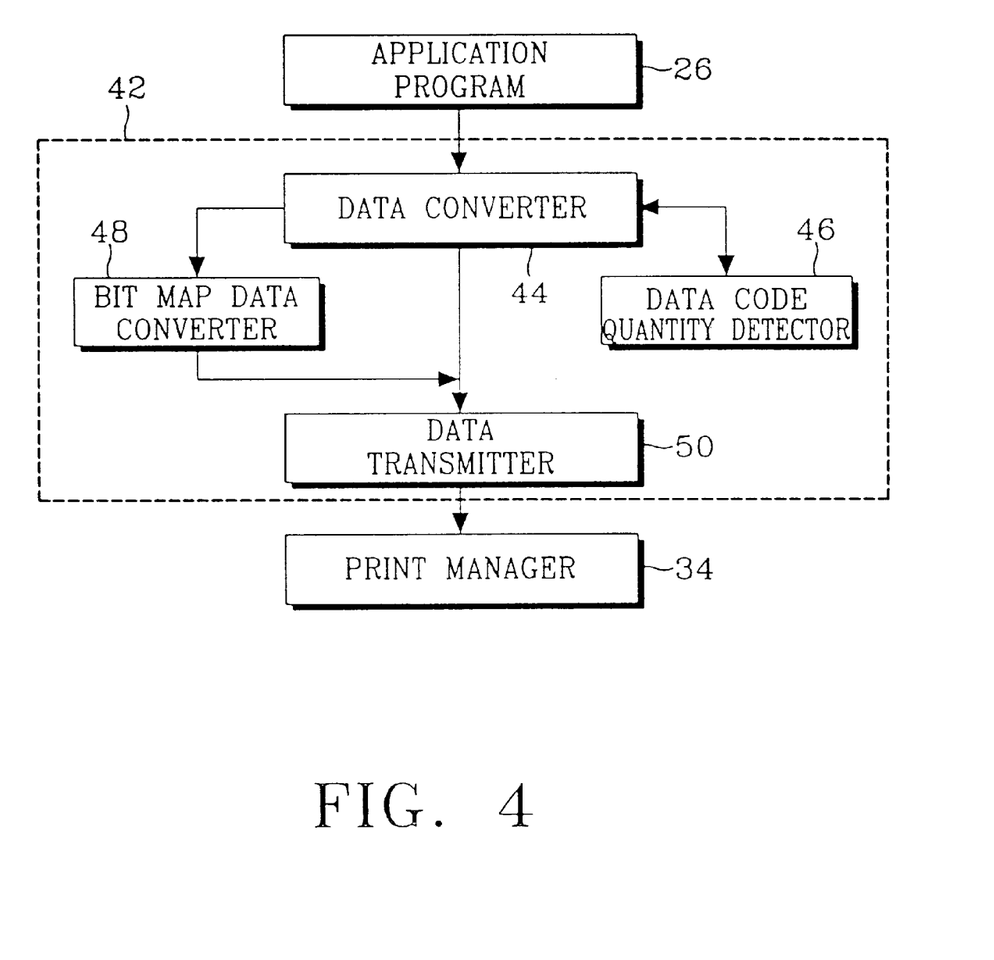
FIG. 4 is an illustration showing a printing program as may be practiced according to an embodiment of the present invention.

Referring to FIG. 4, the printing program according to a preferred embodiment of the present invention includes an application program 26, a printer driver 42, and a print manager 34. The printer driver 42 includes a data converter 44, a data code quantity detector 46, a bit map data converter 48, and a data transmitter 50. If the GUI application program 26 executes a printing command for printing out an image that the user has worked on, the data converter 44 of the printer driver 42 reads out printing data from the memory 20 and converts the printing data into a data code that can be processed by a video controller 62 provided in the printer 18. Here, the memory 20 stores the printing data for the image that the user has worked on. The data code quantity detector 46 detects whether or not the quantity of the data code exceeds a predetermined quantity that can be stored in a RAM of the video controller 62. As a result of the detection, if the data code quantity exceeds the predetermined quantity (i.e., the storage capacity of the RAM), the bit map data converter 48 converts the data code into the bit map data and transmits the bit map data to the print manager 34 via the data transmitter 50. Otherwise, if the data code quantity does not exceed the storage capacity of the RAM, the data transmitter 50 transmits the data code received from the data converter 44 to the print manager 34. If the program is established such that the print manager 34 operates on the GUI environment, the data code is sequentially transmitted to the printer 18 via the input/output interface 12.

Figure 5:
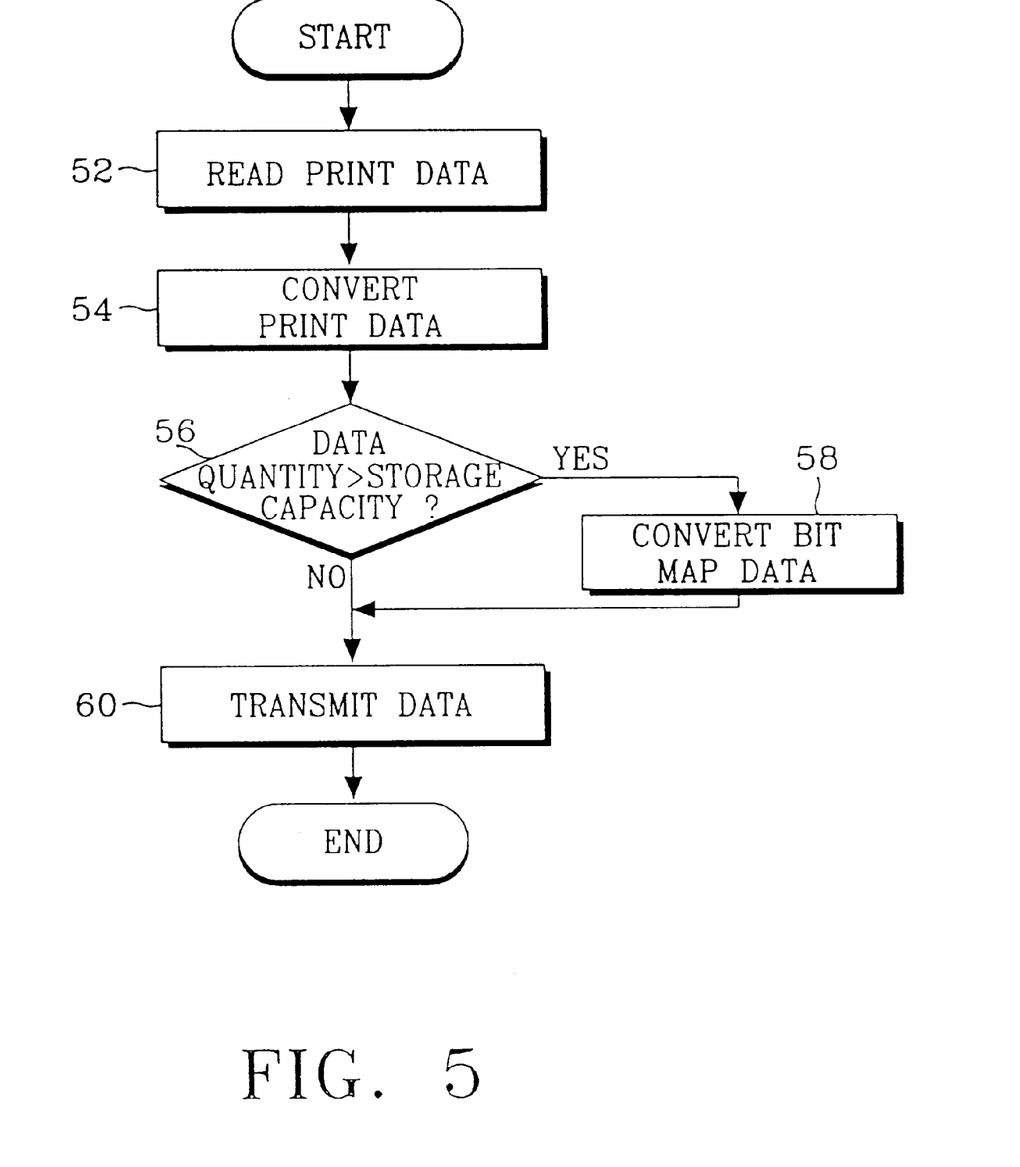
FIG. 5 is a flow chart for converting printing data with a printer driver shown in FIG. 4.

FIG. 5 is a flow chart for converting printing data in the printer driver 42 of FIG. 4. If the GUI application program 26 applies the printing command to the input device 14 to print out the image, printing start data is transmitted to the CPU 10 through the input/output interface 12. Then, the CPU 10 controls a process flow of the printer driver 42 in accordance with the printing start data. As the process flow of the printer driver 28 begins, the CPU 10 reads out, at a step 52, the printing data from the memory 20 storing the image that the user desires to print out. Then, at a step 54, the CPU 10 converts the printing data into the data code that can be processed at the video controller 62 provided in the printer 18. At a step 56, the CPU 10 compares the quantity of the data code with the storage capacity of the RAM prepared in the video controller 62 of the printer 18. As the result of the comparison, if the quantity of the data code exceeds the storage capacity of the RAM, the CPU 10 proceeds to a step 58 to convert the data code into the bit map data; otherwise, the CPU 10 proceeds to a step 60 to transmit the data code to the print manager 34.

One should note that the bit map data conversion according to the present invention is performed at the printer driver 42, though it has been conventionally performed at the printer 18. Further, when using a dummy printer, the computer with the above stated structure provides the bit map data to print it out. Upon completion of the bit map data conversion at the step 58, the CPU 10 transmits the bit map data to the print manager 34 at the step 60. Thereafter, when the data transmission to the print manager 34 is completed, the process flow of the printer driver 42 ends. Then, the print manager 34 selectively receives the bit map data or the data code and sequentially transmits the data to the printer 18.

As described above, in the case where the quantity of the data code transmitted from the host computer exceeds a storage capacity of the RAM provided in the printer, the printer driver according to the present invention converts the data code into the bit map data and transmits the converted bit map data to the print engine of the printer. Therefore, unlike a contemporary practice device, the printer does not need an extra memory for storing the excessive data code.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A computing and printing system, comprising:

a computing apparatus having a central processor running an application program and sending a print data code containing print information to be printed, a data converting program linked to a bit map data converting program, a data code quantity detector for comparing a quantity of the print data code to a predetermined capacity of a print data memory, said bit map data converting program converting the print data code into bit map data containing bit map information when the data code quantity detector indicates the quantity of the print data code as greater than the predetermined capacity of the print data memory, and a data transmitting program sending the print data code to a print managing program when the quantity of the print data code is not greater than the predetermined capacity of the print data memory, and sending the bit map data to the print managing program when the quantity of the print data code is greater than the predetermined capacity of the print data memory;

an input and output interface receiving the print data code and the bit map data from said central processor; and a printing apparatus receiving the print data code and the bit map from said input and output interface, and printing images represented by the print data code and the bit map data onto a print medium according to print instructions from the print managing program.

2. The system of claim 1, wherein said printing apparatus comprises:

a video controller receiving, from said input and output interface, information regarding the print data code and the bit map data to be printed;

a print engine mechanically operating a print process for printing the print data code and the bit map data; and an operator panel accepting key instructions regarding operation of said print engine upon a keying by a user.

3. The system of claim 2, wherein said print data memory has a random access memory component and is part of said video controller.

4. The system of claim 2, wherein said video controller comprises:

a computer interface connecting said video controller to said input and output interface, and receiving the bit map data and the print data code;

a video control circuit processing the bit map data and the print data code; and an engine interface connecting said video controller to said print engine.

5. The system of claim 2, wherein said print engine comprises:

a video interface connecting said print engine to said video controller;

an engine controller controlling the print process by sending print instructions regarding the print process;

a data interface relaying the print instructions from said engine controller and relaying condition signals to said engine controller;

a sensor circuit receiving the print instructions from said data interface, sensing operations conditions of said printing apparatus, and sending the condition signals to said data interface;

a mechanism driver receiving the print instructions from said data interface and driving mechanisms of said printing apparatus; and an electrophotography developing device receiving the print instructions from said data interface and printing onto the print medium by electrophotography.

6. The system of claim 1, wherein said computing apparatus further comprises:

a monitor displaying display data from said central processor;

a display controller relaying the display data to said monitor upon display instructions from said central processor; and a main memory storing predetermined data and a predetermined software program to be used by said central processor.

7. The system of claim 1, wherein the system further comprises:

an input device connected to said input and output interface and accepting user commands entered by a user; and an auxiliary memory connected to said input and output interface and having disk drives.

8. A computing apparatus for a printing system, comprising:

a central processor running an application program sending a print data code containing print information to be printed, a data converting program linked to a bit map data converting program converting the print data code into bit map data containing bit map information when a data code quantity detector indicates quantity of the print data code as greater than a predetermined capacity of print data memory, and a data transmitting program sending the print data code to a print managing program when the quantity of the print data code is not greater than the predetermined capacity of the print data memory and sending the bit map data to the print managing program when the quantity of the print data code is greater than the predetermined capacity of the print data memory; and an input and output interface receiving the print data code and the bit map data from said central processor, and sending the print data code and the bit map data to a printing apparatus when the print managing program sends a print command indicating a need for printing onto a print medium.

9. The computing apparatus of claim 8, wherein the computing apparatus further comprises:

a monitor displaying display data from said central processor;

a display controller relaying the display data to said monitor upon display instructions from said central processor; and a main memory storing predetermined data and predetermined software programs to be used by said central processor.

10. The computing apparatus of claim 8, wherein the computing apparatus further comprises:

an input device connected to said input and output interface and accepting user commands entered by a user; and an auxiliary memory connected to said input and output interface and having disk drives.

11. The computing apparatus of claim 9, wherein the predetermined software programs comprise:

the application program;

the data converting program;

the bit map data converting program;

the data transmitting program; and the print managing program.

12. The computing apparatus of claim 9, wherein the predetermined software programs:

convert print image data into the print data code; and compare the quantity of the print data code with the predetermined capacity of print data memory; and wherein, when the quantity of the print data code exceeds the predetermined capacity of the print data memory, the predetermined software programs convert the print data code into the bit map data, and transmit the bit map data to said printing apparatus; and wherein, when the quantity of the data code does not exceed the predetermined capacity of the print data memory, the predetermined software programs transmit the print data code to said printing apparatus.

13. A method for converting printing data, comprising the steps of:

converting printing data into a data code;

comparing a quantity of the data code with a prepared storage capacity of a memory in a printer;

when the quantity of the data code exceeds the prepared storage capacity of the memory, converting the data code into bit map data to be processed at a print engine of the printer, and transmitting the bit map data to the printer; and when the quantity of the data code does not exceed the prepared storage capacity of the memory, transmitting the data code to the printer.

14. The method of claim 13, wherein the data code and the bit map data are sequentially sent to a print managing program transmitting to said printing apparatus.

15. The method of claim 13, wherein the memory comprises a random access memory.

16. A computer and printing system, comprising:

a computing apparatus including a central processor, a data converting program linked to a bit map data converting program, a data code quantity detector, and a data transmitting program;

an input and output interface receiving a print data code sent by said central processor and bit map data provided by said bit map data converting program; and a printing apparatus receiving the print data code and the bit map data from said input and output interface, and printing images represented by the print data code and the bit map data onto a print medium;

wherein said printing apparatus comprises a print engine for mechanically operating a print processor for printing the print data code and the bit map data; and wherein said print engine comprises an engine controller controlling the print process by sending print instructions regarding the print process, a data interface relaying the printing instructions from said engine controller and relaying condition signals to said engine controller, and a sensor circuit receiving the print instructions from said data interface, sensing operation conditions of said printing apparatus, and sending the condition signals to said data interface.

17. The system of claim 16, wherein said printing apparatus further comprises a video controller receiving, from said input and output interface, information regarding the print data code and the bit map data to be printed, and an operator panel accepting key instructions regarding operation of said print engine upon keying by a user.

18. The system of claim 17, wherein said print engine comprises a video interface connecting said print engine to said video controller, a mechanism driver receiving the print instructions from said data interface and a driving mechanism of said printing apparatus, and an electro-photography developing device receiving the print instructions from said data interface and printing onto the print medium by electro-photography.

19. The system of claim 16, wherein said print engine comprises a video interface connecting said print engine to said video controller, a mechanism driver receiving the print instructions from said data interface and a driving mechanism of said printing apparatus, and an electro-photography developing device receiving the print instructions from said data interface and printing onto the print medium by electro-photography.

* * * * *